United States Patent [19]

Herzig

[11] Patent Number: 5,151,473
[45] Date of Patent: Sep. 29, 1992

[54] ORGANOPOLYSILOXANES CONTAINING SULFOSUCCINATE GROUPS

[75] Inventor: Christian Herzig, Taching, Fed. Rep. of Germany

[73] Assignee: Wacker-Chemie GmbH, Munich, Fed. Rep. of Germany

[21] Appl. No.: 609,680

[22] Filed: Nov. 6, 1990

[30] Foreign Application Priority Data

Dec. 7, 1989 [DE] Fed. Rep. of Germany ....... 3940536

[51] Int. Cl.$^5$ ............................................. C08F 283/00
[52] U.S. Cl. ..................... 525/474; 528/15; 528/10; 528/26; 528/29
[58] Field of Search ............... 528/29, 26, 10, 15; 525/474

[56] References Cited

U.S. PATENT DOCUMENTS 4,605,712  8/1986  Mueller et al. ................ 525/474
4,927,895  5/1990  Nakane et al. ................. 528/29

Primary Examiner—Melvyn I. Marquis

[57] ABSTRACT

The invention relates to novel organopolysiloxanes which contain sulfosuccinate groups and consist of average units of the general formula $$Z_a R_b SiO_{\frac{4-(a+b)}{2}} \quad (I)$$

in which R is the same or different monovalent hydrocarbon radicals having from 1 to 18 carbon atom(s) per radical or monovalent halogenated hydrocarbon radicals having from 1 to 18 carbon atom(s) per radical, Z is a radical of the formula $$\begin{array}{l} HC-CHR^1-Y \\ \parallel \\ -C-CHR^1-Y \end{array}$$

in which Y represents a radical of the formula $$\begin{array}{c} O \quad\quad\quad O \\ \parallel \quad\quad\quad \parallel \\ -O-C-CH-CH_2-C-O^-M^+ \\ \quad\quad\quad | \\ \quad\quad\quad SO_3^-M^+ \end{array}$$

$R^1$ is a hydrogen atom or an alkyl radical having from 1 to 4 carbon atom(s) per radical, $M^+$ represents a hydrogen ion and/or an alkali metal ion or an ammonium ion, a is 0 or 1, with an average of from 0.03 to 1.0, b is 0, 1, 2 or 3, with an average of from 1.0 to 2.5, and the sum of a+b is no greater than 3, with the proviso that the compound contains at least one radical Z per molecule.

6 Claims, No Drawings

ORGANOPOLYSILOXANES CONTAINING SULFOSUCCINATE GROUPS

The present invention relates to organopolysiloxanes containing sulfosuccinate groups and more particularly to a process for preparing organopolysiloxanes containing sulfosuccinate groups.

BACKGROUND OF THE INVENTION

A process for preparing siloxanyl-but-2-ene-1,4-diol compounds is described in DD-A-239 596 (Published 1st October 1986, G. Sonnek et al, VEB Chemiewerk Nünchritz), in which 2-butyne-1,4-diol is reacted with an organopolysiloxane containing Si-bonded hydrogen atoms in the presence of hexachloroplatinic acid, in which the ratio of the triple bond in the 2-butyne-1,4-diol to the SiH groups in the organopolysiloxane containing Si-bonded hydrogen atoms in the reaction is 1:1 to 1:3. The organopolysiloxane containing SiH groups is preferably employed in excess, however, the excess organopolysiloxane containing SiH groups cannot be separated from the end product after the hydrosilylation reaction. In order to avoid a reaction between the reactive hydroxyl groups in the 2-butyne-1,4-diol and the SiH groups in the organopolysiloxane, the reactive hydroxyl groups in the 2-butyne-1,4-diol must be protected by trimethylsilyl groups before the hydrosilylation reaction, and these then have to be split off again after the reaction. (See Examples of DD-A-239,596). The process thus consists of a total of three stages. In Example 11 of DD-A-239,596, the only example in which the trimethylsilyl protective groups are omitted, 2-butyne-1,4-diol is reacted directly with heptamethyltrisiloxane, which contains only one Si-bonded hydrogen atom per molecule, in a stoichiometric ratio, but the end product, 2-heptamethyltrisiloxanyl-but-2-ene-1,4-diol, is obtained only in low purity and in a moderate yield.

DD-A-255,346 (published on 30th March 1988, G. Sonnek et al, Akademie der Wissenschaften der DDR) describes a process for preparing siloxanylalkenediyl-bis-carboxylates in which siloxanyl-but-2-ene-1,4-diol compounds are reacted with saturated or unsaturated anhydrides in the presence of an esterification catalyst. In each case only 2-heptamethyltrisiloxanyl-but-2-ene-1,4-diol or 2-pentadecamethylheptasiloxanyl-but-2-ene-1,4-diol, is employed in the Examples. Thus, the examples disclose using only an organopolysiloxane having only one Si-bonded dihydroxyalkenyl group per molecule.

Organopolysiloxanes containing sulfosuccinate groups which are prepared first by reacting maleic anhydride with an organopolysiloxane containing Si-bonded hydroxyalkyl groups and then reacting the maleate group thus obtained in the organopolysiloxane with sodium bisulfite in the presence of water and a basic substance are described in EP-A-283,156 (laid-open on 21st September 1988, A. R. L. Colas et al, Dow Corning Limited). The availability of the organopolysiloxanes which contain Si-bonded hydroxyalkyl groups that are employed as starting substances is limited because according to W. Noll, Chemistry and Technology of Silicones, Academic Press, Inc., 1968, page 163, the simplest procedure for their preparation, that is the addition of organopolysiloxanes containing SiH groups to unsaturated alcohols, cannot be employed because the SiH bond is also reactive towards the C-OH group.

Therefore, it is an object of the present invention to provide organopolysiloxanes which contain sulfosuccinate groups that have better surface-active properties than was known heretofore. A further object of the present invention is to provide organopolysiloxanes which can be prepared in good yields and by a simple process.

SUMMARY OF THE INVENTION

The foregoing, objections and others which will become apparent from the following description are accomplished in accordance with this invention, generally speaking, by providing organopolysiloxanes which contain sulfosuccinate groups and have average units of the general formula $$Z_a R_b SiO_{\frac{4-(a+b)}{2}} \quad (I)$$

in which R is the same or different monovalent hydrocarbon radicals and halogenated hydrocarbon radicals having from 1 to 18 carbon atom(s) per radical, Z is a radical of the formula

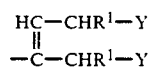

in which Y represents a radical of the formula

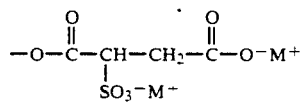

$R^1$ represents a hydrogen atom or an alkyl radical having from 1 to 4 carbon atom(s) per radical, $M^+$ represents a hydrogen ion and/or an alkali metal ion or an ammonium ion, a is 0 or 1, with an average of from 0.03 to 1.0, b is 1, 2, 3 or 3, with an average of from 1.0 to 2.5, and the sum of a+b is no greater than 3, with the proviso that the compound contains at least one radical Z per molecule.

DETAILED DESCRIPTION OF THE INVENTION

Organopolysiloxanes containing sulfosuccinate groups are preferably those of the general formula $$Z_c R_{3-c} SiO(SiR_2O)_n (SiRZO)_m SiR_{3-c} Z_c \quad (II)$$

in which Z and R are the same as above, c is 0 or 1, n is 0 or an integer of from 1 to 500 and m is 0 or an integer of from 1 to 50, with the proviso that the compound contains at least two Z radicals per molecule.

The organopolysiloxanes of this invention which contain sulfosuccinate groups preferably have an average molecular weight of from 400 to 50,000 g/mol, and more preferably from 400 to 5,000 g/mol.

The invention also relates to a process for preparing organopolysiloxanes containing sulfosuccinate groups, which comprises reacting, in a first stage, a dihydroxyalkyne (1) with an organopolysiloxane (2) having at least one Si-bonded hydrogen atom per molecule in amounts of from 1.03 to 2.0 mol of dihydroxyalkyne (1) per gram-atom of Si-bonded hydrogen in the organopolysiloxane (2) in the presence of a catalyst (3) which promotes the addition of Si-bonded hydrogen to an aliphatic multiple bond; in a second stage, reacting the dihydroxyalkenyl groups of the organopolysiloxane obtained in the first stage with maleic anhydride and then in a third stage, reacting the maleate groups of the organopolysiloxane obtained in the second stage with an alkali metal bisulfite or ammonium bisulfite in the presence of water and a basic compound.

The invention further relates to a process for preparing organopolysiloxanes containing dihydroxyalkenyl groups by reacting a dihydroxyalkyne (1) with an organopolysiloxane (2) having at least one Si-bonded hydrogen atom per molecule in amounts of from 1.03 to 2.0 mol of dihydroxyalkyne (1) per gram-atom of Si-bonded hydrogen in the organopolysiloxane (2) in the presence of a catalyst (3) which promotes the addition of Si-bonded hydrogen to an aliphatic multiple bond.

According to DD-A-239,596, cited above, it was not expected that by using a small excess of dihydroxyalkyne (1), protective groups do not have to be introduced for the reactive hydroxyl groups of the dihydroxyalkyne and that organopolysiloxanes containing dihydroxyalkenyl groups are obtained in a high purity and in good yields even if they contain more than one Si-bonded dihydroxyalkenyl group per molecule.

Examples of radicals represented by R are alkyl radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical, and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl and the allyl radicals; cycloalkyl radicals, such as cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the α- and the β-phenethyl radical. The methyl radical is the preferred radical.

Examples of halogenated radicals represented by R are halogenoalkyl radicals, such as the 3,3,3-trifluoro-n-propyl radical, the 2,2,2,2',2',2'-hexafluoroisopropyl radical and the heptafluoroisopropyl radical, and halogenoaryl radicals, such as the o-, m- and p-chlorophenyl radical.

Examples of alkyl radicals represented by $R^1$ are the methyl, ethyl, n-propyl, iso-propyl, 1-n-butyl, 2-n-butyl, iso-butyl and tert-butyl radical. The radical $R^1$ is preferably a hydrogen atom.

The ions $M^+$ in the organopolysiloxanes of this invention containing sulfosuccinate groups are preferably sodium ions or hydrogen ions.

The preferred radical Z is the radical of the formula

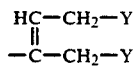

in which Y is a radical of the formula

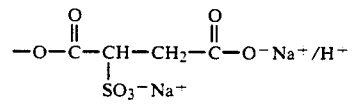

Preferably, dihydroxyalkyne (1) is reacted with an organopolysiloxane (2) having at least one Si-bonded hydrogen atom per molecule in amounts of from 1.03 to 1.10 mol per gram-atom of Si-bonded hydrogen in the organopolysiloxane (2).

The dihydroxyalkyne (1) used in the process of this invention preferably has the general formula $$HO—CHR^1—C≡C—CHR^1—OH,$$

in which $R^1$ is the same as above. Preferably 2-Butyne-1,4-diol is employed.

The organopolysiloxane (2) having at least one Si-bonded hydrogen atom per molecule used in the process of this invention preferably has the formula

in which R is the same as above, d is 0 or 1, with an average of from 0.03 to 1.0, e is 0, 1, 2 or 3, with an average of from 1.0 to 2.5, and the sum of d+e is no greater than 3.

The organopolysiloxane (2) used in the process of this invention preferably has the general formula

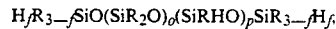

in which R is the same as above, f is 0 or 1, o is 0 or an integer of from 1 to 500 and p is 0 or an integer of from 1 to 50, with the proviso that the compound contains at least two hydrogen atoms per molecule.

The viscosity of the organopolysiloxanes (2) having at least one Si-bonded hydrogen atom per molecule is preferably from 1 to 10,000 $mm^2 \times s^{-1}$ at 25° C., and more preferably from 1 to 1,000 $mm^2 \times s^{-1}$ at 25° C.

Preferred examples of organopolysiloxanes (2) are copolymers of dimethylhydrogensiloxane units and dimethylsiloxane units, copolymers of dimethylhydrogensiloxane units, dimethylsiloxane units and methylhydrogensiloxane units, copolymers of trimethylsiloxane units and methylhydrogen-siloxane units and copolymers of trimethylsiloxane units, dimethylsiloxane units and methylhydrogensiloxane units.

Processes for the preparation of organopolysiloxanes (2) having at least one Si-bonded hydrogen atom per molecule, including those of the preferred type, are known.

The same catalysts which have been or could have been used heretofore for promoting the addition of Si-bonded hydrogen to an aliphatic multiple bond can also be used in the process of this invention as the catalysts (3) to promote the addition of Si-bonded hydrogen to an aliphatic multiple bond. The catalysts (3) are preferably a metal selected from the group of platinum metals or a compound or a complex thereof from the group of platinum metals. Examples of such catalysts are metallic and finely divided platinum, which can be supported on solids such as silicon dioxide, aluminum oxide or active charcoal, and compounds or complexes of platinum, such as platinum halides, for example $PtCl_4$, $H_2PtCl_6.6H_2O$ and $Na_2PtCl_4.4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6\cdot 6H_2O$ and cyclohexanone, platinum-vinylsiloxane complexes, such as platinum-1,3-divinyl-1,1,3,3-tetramethyldisiloxane complexes with or without a detectable amount of inorganically bonded halogen, bis-(gamma-picoline)-platinum dichloride, trimethylenedipyridine-platinum dichloride, dicyclopentadiene-platinum dichloride, (dimethyl sulfoxide)-ethylene-platinum(II) dichloride and reaction products of platinum tetrachloride with an olefin and primary amine or secondary amine or primary and secondary amine according to U.S. Pat. No. 4,292,434, such as the reaction product of platinum tetrachloride dissolved in 1-octene with sec-butylamine, or ammonium-platinum complexes according to EP-B-110,370.

The catalyst (3) is preferably employed in amounts of from 1 to 1,000 ppm by weight (parts by weight per million parts by weight), and more preferably in amounts of from 5 to 50 ppm by weight, calculated as elemental platinum and based on the total weight of dihydroxyalkyne (1) and organopolysiloxane (2) having at least one Si-bonded hydrogen atom per molecule.

The addition reaction (or hydrosilylation reaction) in the first stage of the process of this invention is preferably carried out at the pressure of the surrounding atmosphere, that is, at about 1020 hPa (absolute), but can also be carried out at higher or lower pressures. The addition reaction is preferably carried out at a temperature of from 80° C. to 140° C., and more preferably from 110° C. to 140° C.

Inert organic solvents are preferably used in the first stage of the process of this invention in amounts of from 0 to 70 percent by weight, based on the total weight of dihydroxyalkyne (1) and organopolysiloxane (2) having at least one Si-bonded hydrogen atom per molecule. Examples of inert organic solvents are toluene, xylene, ethylbenzene, dioxane, 1,2-dimethoxyethane, butylacetate, ethyl butyrate, methyl ethyl ketone, cyclohexanone and isophorone.

In the hydrosilylation carried out in the first stage of the process of this invention, an organopolysiloxane containing dihydroxyalkenyl groups is obtained in accordance with the following equation:

$$\equiv Si-H + HO-CHR^1-C\equiv C-CHR^1-OH \rightarrow$$

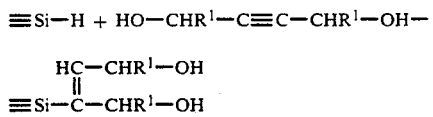

The organopolysiloxane containing dihydroxyalkenyl groups which is preferably obtained has average units of the formula $$X_g R_h SiO_{\frac{4-(g+h)}{2}}$$

in which R is the same as above and X is a radical of the formula

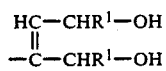

in which $R^1$ is the same as above, g is 0 or 1, with an average of from 0.03 to 1.0, h is 0, 1, 2 or 3, with an average of from 1.0 to 2.5, and the sum of $g+h$ is no greater than 3, with the proviso that the compound contains at least one radical X per molecule.

The organopolysiloxane containing dihydroxyalkenyl groups which is preferably obtained has the general formula

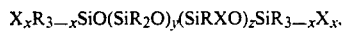

in which R and X are the same as above, x is 0 or 1, y is 0 or an integer of from 1 to 500 and z is 0 or an integer of from 1 to 50, with the proviso that the compound contains at least two X radicals per molecule.

The organopolysiloxanes containing dihydroxyalkenyl groups preferably having an average molecular weight of from 200 to 50,000 g/mol and more preferably from 200 to 5,000 g/mol.

Excess dihydroxyalkyne (1) and if appropriate the inert organic solvent also used are removed by distillation from the organopolysiloxane containing dihydroxyalkenyl groups which is obtained in the first stage of the process of this invention.

In the second stage of the process of this invention, the dihydroxyalkenyl groups of the organopolysiloxane obtained in the first stage are esterified with maleic anhydride and an organopolysiloxane containing maleate groups is obtained, in accordance with the following equation:

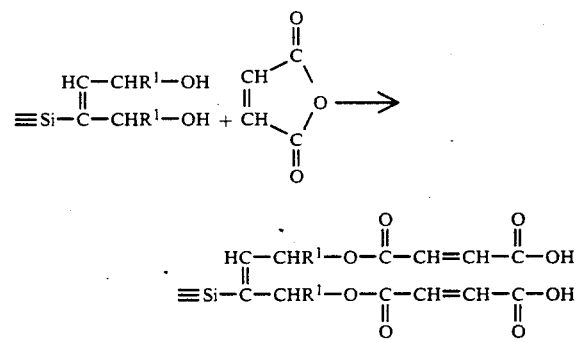

In the second stage of the process of this invention, maleic anhydride is reacted with the dihydroxyalkylene groups X of the organopolysiloxane obtained in the first stage, preferably in amounts of from 2.0 to 3.0 mols, and more preferably from 2.1 to 2.5 mols, of maleic anhydride per mol of dihydroxyalkenyl group X in the organopolysiloxane.

An inert organic solvent is preferably used in the second stage of the process of this invention in amounts of from 0 to 70 percent by weight, based on the total weight of organopolysiloxane containing dihydroxyalkenyl groups employed. Examples of inert organic solvents are toluene, xylene, ethylbenzene, dioxane, 1,2-dimethoxyethane, butyl acetate and ethyl butyrate.

If appropriate, an esterification catalyst, such as titanium butylate, magnesium acetate or calcium oxide, can also be used in the second stage of the process of this invention.

The esterification in the second stage of the process of this invention is preferably carried out at 60° C. to 120° C., preferably from 80° C. to 110° C., and preferably at the pressure of the surrounding atmosphere, that is, at about 1020 hPa (absolute). If desired, however, higher and lower pressures can also be used.

The organopolysiloxane containing maleate groups which is preferably obtained in the second stage of the process of this invention is one having average units of the formula

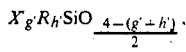

in which R is the same as above and X' is a radical of the formula

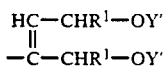

in which R¹ is the same as above and Y' is a radical of the formula

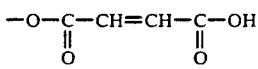

g' is 0 or 1, with an average of from 0.03 to 1.0, h' is 0, 1, 2 or 3, with an average of from 1.0 to 2.5, and the sum of g'+h' is no greater than 3, with the proviso that the compound contains at least one X' radical per molecule.

The organopolysiloxane containing maleate groups which is preferably obtained in the second stage of the process of this invention has the general formula

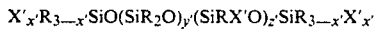

in which R and X' are the same as above, x' is 0 or 1, y' is 0 or an integer of from 1 to 500 and z'is 0 or an integer of from 1 to 50, with the proviso that the compound contains at least two X' radicals per molecule.

In the third stage of the process of this invention, the maleate groups Y' of the organopolysiloxane obtained in the second stage are preferably reacted with sodium bisulfite. In this reaction, the alkali metal bisulfite can be added directly or in the form of a precursor, which is converted into the alkali metal bisulfite in situ under the reaction conditions, for example, Na₂S₂O₅ which is converted into NaHSO₃ in the presence of water.

The alkali metal bisulfite or ammonium bisulfite or precursors thereof are preferably employed in the third stage of the process of this invention in amounts such that from 0.8 to 1.2 mol, and more preferably from 0.9 to 1.1 mol, of alkali metal bisulfite or ammonium bisulfite are present per mol of maleate group Y' in the organopolysiloxane obtained in the second stage.

Basic compounds which are employed in the third stage of the process of this invention are those which react with the carboxyl group of the maleate group Y' to form a salt. Examples of basic compounds are alkali metal hydroxides, such as sodium hydroxide and potassium hydroxide, with sodium hydroxide being the preferred alkali metal hydroxides. The water and basic compounds are preferably employed in the form of an aqueous NaOH solution.

Short-chain alcohols, such as methanol, ethanol, propanol or isopropanol, with methanol being the preferred alcohol, are preferably used in the third stage of the process of this invention in amounts of preferably from 20 to 80 percent by weight, based on the total weight of organopolysiloxane employed containing maleate groups.

The sulfonation in the third stage of the process of this invention is preferably carried out at temperatures of from 60° C. to 100° C., and more preferably from 70° C. to 90° C., and preferably at the pressure of the surrounding atmosphere, that is, at about 1020 hPa (absolute). If desired, however, it is also possible to use higher or lower pressures.

The third stage of the process of this invention is preferably carried out by mixing the organopolysiloxane containing Y' groups which is obtained in the second stage with a short-chain alkanol, such as methanol, subsequently adding NaHSO₃ or Na₂S₂O₅ to the mixture and then adding an aqueous NaOH solution to the reaction mixture until the mixture preferably has a pH in the range of from 6 to 8, and more preferably about 7.

The various stages of the process of this invention can be carried out in one and the same reaction vessel in succession or in separate reaction vessels. The process is preferably carried in succession in one and the same reaction vessel. The process of this invention can be carried out batchwise, semi-continuously or continuously.

The organopolysiloxanes of this invention containing sulfosuccinate groups have both hydrophobic and hydrophilic groups in the same molecule and therefore exhibit pronounced surface-active properties. They can thus be used as emulsifiers or foaming agents in aqueous systems.

EXAMPLE 1

A mixture containing 181 g (2.1 mol) of 2-butyne-1,4-diol, 6 mg of platinum in the form of a solution of platinum tetrachloride in 1-octene and 40 g of toluene is heated to 110° C. under a nitrogen atmosphere. About 612 g of α,w-dihydrogendimethylpolysiloxane having a viscosity of 4 mm²×s⁻¹ at 25° C. (corresponding to 2.0 g of Si-bonded hydrogen) are then added dropwise to the heated mixture, during which the temperature of the mixture rises to about 130° C. After a reaction time of about 8 hours at 130° C., about 99 percent of the Si-bonded hydrogen atoms of the α,w-dihydrogendimethylpolysiloxanes have reacted. The volatile constituents, such as excess 2-butyne-1,4-diol and toluene, are removed by distillation at 140° C. under 10⁻³ hPa (absolute). About 720 g (92 percent of theory) of a diorganopolysiloxane having a viscosity of 356 mm²×s⁻¹ at 25° C. are obtained. According to the ¹H-NMR spectrum and the ²⁹Si-NMR spectrum, the resultant diorganopolysiloxane has the following formula HOCH₂—CH=C(CH₂OH)SiMe₂O[SiMe₂O]ₐMe₂-SiC(CH₂OH)=CHCH₂OH in which Me is a methyl radical and a is an average of 6.6. The following data are obtained from the ²⁹Si-NMR spectrum:

| ²⁹Si-NMR spectrum: (C₆D₆) | δ = −1.9 ppm (2 Si, —CH=C—SiMe₂O) −20 to −22 ppm (6.6 Si, OSiMe₂O) |
|---|---|

No bonds of the following type —CH₂—O—Si≡, which would originate from a reaction of the hydroxyl groups of the 2-butyne-1,4-diol with the Si-bonded hydrogen atoms in the α,w-dihydrogendimethylpolysiloxane, are detectable from the ²⁹Si-NMR spectrum.

EXAMPLE 2

(a) About 165 g of the diorganopolysiloxanes prepared in accordance with Example 1 are reacted with 98 g of maleic anhydride at 70° C. After a reaction time of 6 hours, the volatile constituents, such as excess maleic anhydride, are removed by distillation at 100° C. under 8 hPa (absolute). According to the IR spectrum, a dimethylpolysiloxane having an Si-bonded radical of the formula

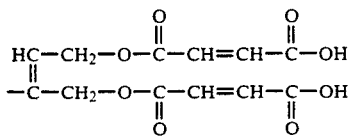

in each of the terminal units is obtained. The IR spectrum shows the band of the carbonyl groups at 1733 cm$^{-1}$ and the band for the double bond in the maleate groups,

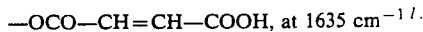

(b) The dimethylpolysiloxane containing maleate groups obtained in (a) above is dissolved in 800 ml of methanol. About 75.5 g of $Na_2S_2O_5$ are added to the solution. The pH of the reaction mixture is brought to a value of about 7 by addition of 1 N NaOH. The reaction mixture is then heated at 76° C. for 7 hours. The water and methanol are subsequently removed by distillation at 100° C. under 10 hPa. About 300 g of a yellowish solid of good water-solubility are obtained. A 1 percent solution of the dimethylpolysiloxane thus obtained, having an Si-bonded group of the formula

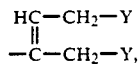

in which Y is a radical of the formula

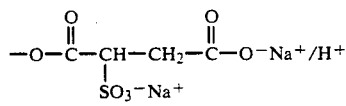

in each of the terminal units, has a surface tension of 31.7 dynes/cm.

EXAMPLE 3

A mixture containing 181 g (2.1 mol) of 2-butyne-1,4-diol, 6 mg of platinum in the form of a solution of platinum tetrachloride in 1-octene and 40 g of toluene is heated to 125° C. under a nitrogen atmosphere. About 364 g of a copolymer of methylhydrogensiloxane units, dimethylsiloxane units and trimethylsiloxane units which contains 0.55 percent by weight of Si-bonded hydrogen and has a viscosity of 11.2 mm$^2 \times$s$^{-1}$ at 25° C. are added dropwise to this mixture over a period of two hours. After a reaction time of about 8 hours at 125° C., 99 percent of the Si-bonded hydrogen atoms of the copolymer have reacted. The volatile constituents are removed from the crude product by distillation at 140° C. under 10$^{-3}$ hPa (absolute). About 510 g (95 percent of theory) of an organopolysiloxane containing trimethylsiloxane units, dimethylsiloxane units and siloxane units of the formula

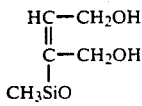

are obtained. The IR spectrum shows the band for the C=C double bond at 1620 cm$^{-1}$ and the $^1$H-NMR spectrum shows a peak, which is characteristically broad for a polymeric substance, for the olefinic hydrogen atom in the hydroxybutenyl group

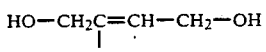

at 6.1 ppm.

No bonds of the following type —CH$_2$—O—Si≡, which would originate from a reaction of the hydroxyl groups of the 2-butyne-1,4-diol with the Si-bonded hydrogen atoms in the copolymer containing methylhydrogensiloxane units can be detected from the $^{29}$Si-NMR spectrum.

EXAMPLE 4

About 130 g of the organopolysiloxane prepared in accordance with the procedure of Example 3 are dissolved in 50 g of toluene. About 120 g of maleic anhydride are added to the solution and the reaction mixture is stirred at 80° C. for 5 hours. The volatile constituents, such as toluene and excess maleic anhydride, are then removed from the clear solution by distillation at 100° C. under 8 hPa (absolute). The oil which remains is dissolved in 1 liter of methanol. About 92 g of $Na_2S_2O_5$ are added to the solution under the influence of heat and the reaction solution is then neutralized with 1 N NaOH and subsequently boiled under reflux for 6 hours. The volatile constituents are removed from the crude product by distillation at 100° C. under 10 hPa (absolute). About 350 g of a pale yellowish solid are obtained. The solid thus obtained is an organopolysiloxane containing trimethylsiloxane units, dimethylsiloxane units and siloxane units of the formula

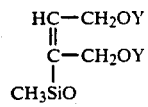

in which Y is a radical of the formula

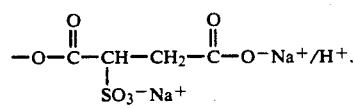

A 1 percent aqueous solution of this organopolysiloxane has a surface tension of 24.6 dynes/cm.

EXAMPLE 5

A mixture containing 88.6 g (1.03 mol) of 2-butyne-1,4-diol, 3 mg of platinum in the form of a solution of platinum tetrachloride in 1-octene and 20 g of toluene are heated to 115° C. under a nitrogen atmosphere. About 182 g (corresponding to 1.00 gram-atom of Si-bonded hydrogen) of a copolymer of methylhydrogensiloxane units, dimethylsiloxane units and trimethylsiloxane units containing 0.55 percent by weight of Si-bonded hydrogen are then added dropwise to the heated mixture, during which the temperature of the mixture rises to 125° C. After a reaction time of about 24 hours at 125° C., 98.9 percent of the Si-bonded hydrogen atoms of the copolymer have reacted. The volatile constituents are removed by distillation at 100° C. under 12 hPa (absolute) over a period of one hour. A clear product having a viscosity of $1.16 \times 10^5$ mm$^2 \times$s$^{-1}$ at 25° C. is obtained.

The organopolysiloxane thus obtained contains trimethylsiloxane units, dimethylsiloxane units and siloxane units of the formula

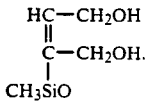

No bonds of the following type $-CH_2-O-Si\equiv$, which would originate from a reaction of the hydroxyl group of the 2-butyne-1,4-diol with the Si-bonded hydrogen atoms in the methylhydrogensiloxane units of the copolymer, are detectable from the $^{29}$Si-NMR spectrum, and these bonds thus lie below the detection limit.

COMPARISON EXAMPLE (ACCORDING TO DD-A-239,596):

The procedure described in Example 5 is repeated, except that 84.3 g (0.98 mol) of 2-butyne-1,4-diol are employed instead of 88.6 g (1.03 mol) of 2-butyne-1,4-diol. A clear product having a viscosity of $2.38 \times 10^5$ mm$^2 \times$s$^{-1}$ is obtained. The viscosity, which is about twice as high as that of Example 5, is caused by a side reaction which occurs between the hydroxyl group of the 2-butyne-1,4-diol and the Si-bonded hydrogen atoms of the copolymer. Bonds of the following type $-CH_2-O-Si\equiv$ originating from this side reaction can be seen from the $^{29}$Si-NMR spectrum, at $-60$ ppm.

What is claimed is:

1. An organopolysiloxane which contains sulfo-succinate groups and contains average units of the general formula $$Z_a R_b SiO_{\frac{4-(a+b)}{2}} \qquad (I)$$

in which R is selected from the group consisting of monovalent hydrocarbon radicals having from 1 to 18 carbon atom(s) per radical and monovalent halogenated hydrocarbon radicals having from 1 to 18 carbon atom(s) per radical, Z is a radical of the formula

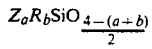

in which Y is a radical of the formula

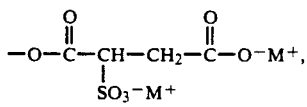

$R^1$ is selected from the group consisting of a hydrogen atom and an alkyl radical having from 1 to 4 carbon atom(s) per radical and M$^+$ is selected from the group consisting of a hydrogen ion, an alkali metal ion, an ammonium ion and mixtures thereof, a is 0 or 1, with an average of from 0.03 to 1.0, b is 0, 1, 2 or 3, with an average of from 1.0 to 2.5, and the sum of a+b does not exceed 3, with the proviso that the compound contains at least one Z radical per molecule.

2. The organopolysiloxane of claim 1, which has the general formula $$Z_c R_{3-c} SiO(SiR_2O)_n(SiRZO)_m SiR_{3-c} Z_c \qquad (II)$$

in which R is selected from the group consisting of monovalent hydrocarbon radicals having from 1 to 18 carbon atom(s) per radical and monovalent halogenated hydrocarbon radicals having from 1 to 18 carbon atom(s) per radical, Z is a radical of the formula

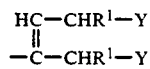

in which Y is a radical of the formula

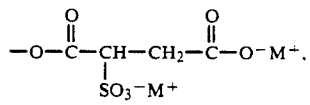

$R^1$ is selected from the group consisting of a hydrogen atom and an alkyl radical having from 1 to 4 carbon atom(s) per radical, M$^+$ is selected from the group consisting of a hydrogen ion, an alkali metal ion, an ammonium ion and mixtures thereof, c is 0 or 1, n is 0 or an integer of from 1 to 500 and m is 0 or an integer of from 1 to 50, with the proviso that the compound contains at least two Z radicals per molecule.

3. A process for preparing an organopolysiloxane containing sulfosuccinate groups, which comprises reacting in a first stage, a dihydroxyalkyne (1) with an organopolysiloxane (2) having at least one Si-bonded hydrogen atom per molecule and is represented by the general formula $$H_d R_e SiO_{\frac{4-(d+e)}{2}}$$

in which R is selected from the group consisting of monovalent hydrocarbon radicals having from 1 to 18 carbon atoms(s) per radical and monovalent halogenated hydrocarbon radicals having from 1 to 18 carbon atom(s) per radical, d is 0 or 1, with an average of from 0.03 to 1.0, e is 0, 1, 2 or 3, with an average of from 1.0 to 2.5, and the sum of d+e does not exceed 3, in an amount of from 1.03 to 2.0 mol of dihydroxyalkyne (1) per gram-atom of Si-bonded hydrogen in the organopolysilxoane (2) in the presence of a catalyst (3) which promotes the addition of Si-bonded hydrogen to an aliphatic multiple bond, reacting in a second stage, the organopolysiloxane containing dihydroxyalkenyl groups obtained in the first stage with maleic anhydride and then reacting in a third stage, the organopolysiloxane containing maleate groups obtained in the second stage with an alkali compound selected from the group consisting of an alkali metal bisulfite and ammonium bisulfite in the presence of water and a basic compound.

4. The process of claim 3, wherein the dihydroxyalkyne (1) has the general formula

HO—CHR$^1$—C≡C—CHR$^1$—OH in which R$^1$ is selected from the group consisting of a hydrogen atom and an alkyl radical having from 1 to 4 carbon atom(s) per radical.

5. The process of claim 3, wherein the organopolysiloxane (2) has the general formula H$_f$R$_{3-f}$SiO(SiR$_2$O)$_o$(SiRHO)$_p$SiR$_{3-f}$H$_f$ in which R is selected from the group consisting of monovalent hydrocarbon radicals having from 1 to 18 carbon atom(s) per radical and monovalent halogenated hydrocarbon radicals having from 1 to 18 carbon atom(s) per radical, f is 0 or 1, o is 0 or an integer of from 1 to 500 and p is 0 or an integer of from 1 to 50, with the proviso that the compound contains at least two hydrogen atoms per molecule.

6. The process of claim 4, wherein the organopolysiloxane (2) has the general formula H$_f$R$_{3-f}$SiO(SiR$_2$O)$_o$(SiRHO)$_p$SiR$_{3-f}$H$_f$ in which R is selected from the group consisting of monovalent hydrocarbon radicals having from 1 to 18 carbon atom(s) per radical and monovalent halogenated hydrocarbon radicals having from 1 to 18 carbon atom(s) per radical, f is 0 or 1, o is 0 or an integer of from 1 to 500 and p is 0 or an integer of from 1 to 50, with the proviso that the compound contains at least two hydrogen atoms per molecule.

* * * * *